Oct. 21, 1924.
F. J. SPITTLER
1,512,811
DEMOUNTABLE WHEEL RIM
Filed Sept. 15, 1923
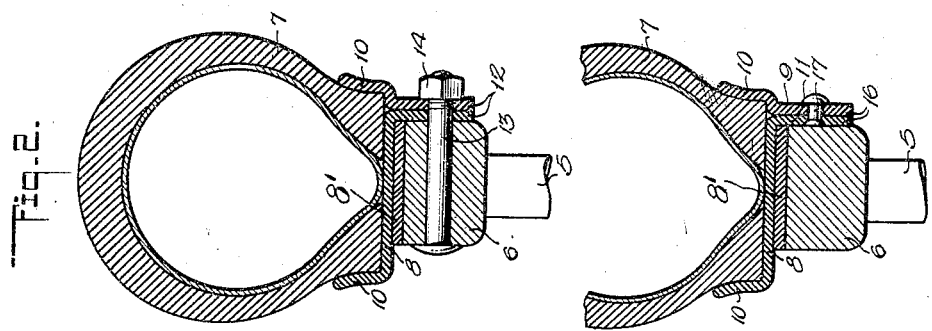
INVENTOR
F.J. SPITTLER Patented Oct. 21, 1924.

1,512,811

UNITED STATES PATENT OFFICE.

FREDERICK J. SPITTLER, OF LONG ISLAND CITY, NEW YORK.

DEMOUNTABLE WHEEL RIM.

Application filed September 15, 1923. Serial No. 662,982.

*To all whom it may concern:*

Be it known that I, FREDERICK J. SPITTLER, a citizen of the United States, and a resident of the city of New York, Long Island City, borough of Queens, in the county of Queens and State of New York, have invented a new and Improved Demountable Wheel Rim, of which the following is a full, clear, and exact description.

This invention relates to improvements in vehicle wheels, and has particular reference to a demountable rim therefor.

An object of the invention is to provide an improved demountable rim of simple construction, wherein the sections thereof may be readily and quickly assembled and secured on the wheel and disassembled when changing a tire.

The above and other objects will appear more clearly from the following detail description when taken in connection with the accompanying drawing, which illustrates a preferred embodiment of the inventive idea.

In the drawing:—

Figure 1 is a side elevation, partly broken away and shown in section, of a vehicle wheel constructed in accordance with the invention;

Figure 2 is a section on the line 2—2 of Figure 1; and

Figure 3 is a section on the line 3—3 of Figure 1.

Referring more particularly to the accompanying drawing, the numeral 4 indicates generally a wheel having the spokes 5 and the felly 6 upon which the demountable rim and tire 7 are adapted to be mounted.

The rim, which comprises the essential features of the present invention, includes the inner and outer sections 8 and 9, respectively, each of which is provided with an annular flange 10 for engaging the bead of the tire 7 to retain the same in position. When in position on the felly 6 the base of the inner section 8, which is of greater width than the felly 6, rests upon the felly band 8' and is provided with a lateral flange 11 against which the body portion of the section 9 abuts when the sections are assembled.

At intervals about the peripheries of the abutting portions of the sections the same are provided with registering lugs 12 having openings therethrough for receiving the bolts 13 extending transverely through the felly 6 and upon which are mounted the nuts 14 for securing the sections on the felly.

The inner section 8 is also provided upon its outer edge at intervals about its periphery with retaining lugs 15 that extend laterally from said edge and engage the inner periphery of the section 9.

For further retaining the sections 8 and 9 in co-operative relation the same are provided with registering lugs 16 interspersed between the lugs 12. Each of the lugs 16 carried by the inner section 8 has projecting outwardly therefrom a stud 17 which is engageable in a key-hole slot 18 formed in the co-operating lug 16 of the outer section 9. When the studs 17 are engaged in the small or reduced ends of the key-hole slots 18 the various lugs 12 and 16 are registered or in alignment, so that the openings in the lugs 12 will also be aligned to receive the bolts 13 thus enabling the rim and tire to be placed upon the felly of the wheel, after which the nuts 14 may be threaded on said bolts.

To remove the rim and tire from the wheel and thereafter remove the tire from the rim the nuts 14 are first threaded from the bolts permitting of the rim and tire being detached from the wheel. Then by circumferential or rotary movement of the section 9 relative to the section 8 the studs 17 may be disengaged from the reduced ends of the key-hole slots and registered with the enlarged ends of said slots whereupon the section 9 may be detached from engagement with the section 8 thus permitting the tire 7 to be dismounted from the latter section.

What is claimed is:

In a demountable rim, inner and outer sections each having tire retaining flanges, said sections also having lugs provided with registering openings for receiving fastening means for securing the rim upon a wheel, other co-operating lugs formed upon said sections and interspersed between the first named lugs, certain of said other lugs having keyhole slots therein, studs carried by the other lugs co-operating with the last named lugs and engageable in said key-hole slots to prevent detachment of said sections said key-hole slots permitting of relative rotary movement between said sections whereby one may be detached from operative engagement with the other, and retaining lugs extending laterally from the outer edge of said inner section and engageable with the inner periphery of the outer section.

FREDERICK J. SPITTLER.